United States Patent Office 3,808,175
Patented Apr. 30, 1974

3,808,175
POLYVINYL DICARBOXYLIC ACID RESIN PRODUCTS AND USES
John O'Neill Printy, 785 N. Waukegan Road, Lake Forest, Ill. 60045
No Drawing. Continuation of abandoned application Ser. No. 616,498, Feb. 16, 1967. This application Dec. 30, 1969, Ser. No. 888,124
Int. Cl. C08f 3/34, 3/52
U.S. Cl. 260—78.4 D    9 Claims

ABSTRACT OF THE DISCLOSURE

Polyvinyl dicarboxylic acid half esters are prepared by reacting a dicarboxylic acid anhydride with polyvinyl alcohol (partially or completely hydrolyzed polyvinyl acylate, e.g., hydrolyzed polyvinyl acetate) in anhydrous water miscible solvents wherein the reactants are partially soluble and the product is substantially soluble, e.g., dioxane. The resultant products are used for many purposes, e.g., to form coatings and self-supporting films, especially anti-tarnish and anti-oxidation coatings for metals, anti-fungal coatings for living plants, fresh fruits and vegetables, hair sprays, skin coatings, cosmetic coatings, leather coatings, textile coatings, temporary coatings to protect metals and other articles temporarily between stages of manufacturing operations, and finished protective coatings.

---

This application is a continuation of application S.N. 616,498, filed Feb. 16, 1967, now abandoned.

This invention relates to a process of preparing polyvinyl dicarboxylic half esters, especially polyvinyl phthalate, and more particularly to novel compositions comprised of these half esters, either alone or in combination with other functional agents, such as dyes, pigments, photosensitive materials, and pharmaceuticals.

It is known in the art to prepare polyvinyl dicarboxylic half esters by various methods. Thus, one of the earlier methods involves reacting polyvinyl alcohol with a dicarboxylic acid or anhydride, such as, phthalic anhydride, in the presence of some catalytic agent, such as pyridine or other tertiary bases as described in U.S. Pat. 2,023,485. Another method described in U.S. Pat. 2,759,909, involves reacting a dicarboxylic acid anhydride with polyvinyl alcohol in a bath in which a lower fatty acid is employed as a solvent and a basic salt is employed as the catalyst. Other methods have also been used but in general the processes heretofore employed for the preparation of polyvinyl dicarboxylic half esters require the presence of either a catalyst or promoter, or both, and have left much to be desired, either with respect to the time required for the reaction to proceed, the type of product produced or problems encountered in carrying out the process. The manner in which the process is caused to be carried out also affects the properties and purity of the products, especially where the process involves the deliberate introduction of impurities, such as catalysts and promoters, which may remain to some degree in the desired end products or which are difficult to remove therefrom.

One of the objectives of the present invention is to provide a new and improved, relatively simple process for preparing polyvinyl dicarboxylic half esters.

Another object of the invention is to provide a new and improved simple process for preparing polyvinyl phthalate.

Still a further object of the invention is to provide new and improved compositions which are useful for a wide variety of purposes.

A more specific object of the invention is to provide new and improved compositions that can be applied to either prepared or fresh surfaces such as metals, alloys, ceramics, glass, semiconductor materials, plastics, vegetable, and other synthetic or man-made materials such as paper, cloth, etc., and will keep such surfaces in their original state and free from corrosion or oxidation but which at the same time is capable of being readily removed with either slightly alkaline solutions or common organic solvents.

Other specific objects of the invention are the preparation of new and improved compositions containing polyvinyl dicarboxylic acid half esters, especially polyvinyl phthalate, which are useful in the form of solutions or in combination with various types of gaseous propellants to form protective, decorative, or preservative coatings on various types of articles and objects, for example, on photographic film and prints; on finished machine articles; on stainless steel to preserve, for example, a brush finish; on galvanized iron or steel to preserve the fresh chemical surface that is desirable for accepting a subsequent coating; on pewter; on bright ware made of copper, silver, brass or aluminum; as a hair spray; as a cosmetic base for fingernail lacquers and the like; as a pigmented or dye-colored coating for footwear, leather articles, composition wearing and costume accessory apparel, e.g., straw; on white-walled tires; on finished assemblies, e.g., automobiles; on foodstuffs, e.g.., fruit, berries, tuberous items, nuts, and the like, to prolong their shelf life and enhance their appearance; on living plants to reduce their sensitivity or need for moisture or to enhance their appearance and for other desirable systemic effects; as a fungicide for human and animal pharmaceutical application; as a pharmaceutical carrier film for other pharmaceutically active agents; as a covering for wounds, abrasions and burns, and for a wide variety of other purposes where coatings that are easily removable are desired. Other objects will appear hereinafter.

In accordance with the invention it has been found that polyvinyl half esters of good quality are obtained if polyvinyl alcohol (partially or completely hydrolyzed polyvinyl acylate) is reacted with a dicarboxylic acid anhydride in anhydrous water miscible solvents wherein the reactants are partially soluble and the product is substantially soluble.

The term "polyvinyl alcohol" as used herein refers to either a partially or completely hydrolyzed polyvinyl acylate. For instance, polyvinyl alcohol is ordinarily prepared by hydrolyzing polyvinyl acetate, and whereas some types of polyvinyl alcohol are substantially completely hydrolyzed polyvinyl acetates having no more than 5% of acetyl therein, other products may have much larger amounts of combined acyl radical.

The invention is particularly important where the dicarboxylic acid anhydride is phthalic anhydride but it will be understood that other anhydrides can be employed, including, for example, but not limited to substituted phthalic anhydrides, pyromellitic dianhydride, maleic anhydride, succinic anhydride and their substituted anhydrides.

The reacting quantities of anhydride to polyvinyl alcohol are preferably such that essentially all of the hydroxyl groups of the polyvinyl alcohol are reacted to form ester groups but less than stoichiometric amounts of anhydride to hydroxyl may be used to obtain useful variations in the finished products.

The reaction is carried out by adding the required proportions of polyvinyl alcohol and anhydride to an organic solvent boiling above 100° C. at atmospheric pressure, preferably dioxane, and heating to a temperature below the temperature at which the solvent boils. Dioxane boils at 101° C. and it is preferable to heat the reaction mixture to a temperature of about 95–97° C. The use of a high boiling solvent makes it possible to carry out the desired reaction with relatively simple equipment. No pressure vessels or condensers are required. The reaction mass is preferably held at a temperature of 95–97° C. until the reaction is complete. The reaction will take place at temperatures below the preferred temperature but the reaction time is considerably reduced under these conditions. Thereafter, the polyvinyl half ester of the anhydride is separated in any suitable manner.

When phthalic anhydride is used, one method of separation is to add dilute ammonium hydroxide to the dioxane solution to form the water soluble ammonium salt of polyvinyl phthalate. A dilute acid solution, for example, an aqueous solution of hydrochloric acid, is then added to regenerate the acid form of the polyvinyl phthalate which is insoluble in the now water diluted dioxane solution. The precipitated mass is collected and washed with water until it is free of dioxane and ammonium salt. The above described reaction mass can of course be diluted with water alone to precipitate the polyvinyl phthalate if one desires to bypass the alkali-acid addition steps. However, dilution with water alone tends to occlude dioxane in the precipitate which is difficult to remove. Benzene can be added to cause precipitation of the half ester but this creates new problems in removing the benzene. Similarly, toluene and chlorinated liquid hydrocarbons can be employed.

The resultant resin is then dried and can be reconstituted with various types of solvents or converted to the water soluble form with an alkaline material for use as a coating composition or for many other purposes.

The resin in solution is ordinarily used for coating purposes to form supported films but it can also be used in this form by casting or by selection of a suitable bath to prepare unsupported films and fibers. The resin can also be compounded with plasticizers and other processing aids for extrusion and forming.

Other solvents boiling at temperatures above 100° C. can be used, such as, for example, high boiling ketones like cyclohexanone.

The optimum results appear to be obtained by using a reaction temperature of at least 90° C. (194° F.) preferably 95° C. to 100° C. The reaction is carried out in the absence of catalysts, promoters or similar additives.

The invention will be illustrated but is not limited by the following examples in which the quantities are given in parts by weight unless otherwise indicated.

EXAMPLE I

To a three-necked, three-liter flask fitted with a thermometer that extended to within a few centimeters of the bottom of the flask and a stirrer which was adequately positioned for producing a gentle stirring action, there was added 300 mls. dioxane. 100 grams of polyvinyl alcohol (Gelvatol 40–10 grade), and 190 grams of technical phthalic anhydride were then added to the dioxane. The flask can be left open if desired to atmospheric pressure throughout the heating and reaction period. Depending on the particle size of the initial reactants, a slush or slurry was formed. The temperature of the reaction mass was increased and the reaction of the polyvinyl alcohol with the phthalic anhydride began slowly when the temperature reached about 50–60° C. The temperature was gradually raised to a maximum of 95–97° C. to prevent excessive distillation of the dioxane.

As the reaction mass temperature increased the reactants dissolved whereupon the solution became opalescent. After approximately one-half hour the opalescence disappeared, indicating that the reaction was complete, and the solution became a clear straw color. The reaction mass was then held at 95–97° C. for up to another hour to insure completeness of the reaction.

At the end of this period the solution was cooled to about 50° C., care being taken to avoid too much cooling which might result in solidification. The cooled solution was transferred to a neutralizing tank and 100 ml. of 28% ammonium hydroxide diluted to 1000 ml. with water was added to the dioxane solution to form the water soluble ammonium salt of polyvinyl phthalate.

To this solution 100 ml. of 38% hydrochloric acid diluted to 1000 ml. with water was added slowly with constant stirring to regenerate the acid form of the polyvinyl phthalate, usually referred to as the half ester.

As the neutralization point was approached the solution became cloudy, and finally a heavy white amorphous mass formed.

The precipitated mass was collected without unduly compressing it into a solid mass, and washed with water until it was free of dioxane and ammonium chloride. The washed product was collected in a filter press which partially eliminated the mechanically bound water in the resin mass.

The pressed resin, which was milky white at this stage, was then spread for tray drying at a convenient temperature, for example, 40–60° C. The resin during this drying treatment released a considerable amount of bound water in the liquid form and drainage of the tray was provided to hasten the drying cycle. The dried resin was easily friable and straw colored.

EXAMPLE II

The polyvinyl phthalate resin of Example I was made up into aerosol compositions in the following proportions:

|  | Weight percent | | |
| --- | --- | --- | --- |
|  | No. 1 | No. 2 | No. 3 |
| Resin of Example I | 5.0 | 8.0 | 12.0 |
| Alcohol, SDA 40 anhydrous | 45.0 | 42.0 | 38.0 |
| Genetron 22/21 (30:70) | 50.0 | 50.0 |  |
| Genetron 22/21 (40:60) |  |  | 50.0 |

A 24% by weight solution of the resin in ethyl alcohol was prepared by heating with constant stirring. The solution was then filtered. The 24% resin solution in ethyl alcohol was completely soluble at room temperature. Solutions of 16% and 10% by weight (representing 8% and 5% in the finished formulations) were soluble only at elevated temperatures.

The 5% and 8% formulations were prepared by adding the correct amount of the 24% solultion to a suitable aerosol container, and then adding additional ethyl alcohol. The finished container was brought to 130° F. to insure complete solution of the resin in the propellant-solvent mix.

Genetron 22/21 is a mixture of difluorodichloromethane and difluoromonochloromethane.

EXAMPLE III

The polyvinyl phthalate resin of Example I was made into an anhydrous composition by dissolving it with a mixture of acetone and methanol and a small amount of polyethylene glycol 400 monolaurate. The final composition contained 7.4% by weight resin, 92.1% by weight of a mixture of acetone and methanol (3:1 weight proportions) and 0.5% by weight polyethylene glycol 400 monolaurate.

This composition was extremely fast drying with excellent flow characteristics. When applied to an article and allowed to air dry it formed a water-clear, smooth surfaced, flexible film with good resistance to marring, high humidity and water immersion. Dyes, pigments and other functional chemical agents can be added to this formula to produce colored, transparent, color refractive films or films selectively absorbent or reflective to electromagnetic energy.

This formula produces films with good optical properties which makes it useful in the graphic and photographic arts, as such, or as a film lacquer to preserve, for example, the gelatin emulsion layer both prior to and after development, e.g., as an antihalation layer, ultra violet absorbent coating, antistatic coating, or a wash-off relief coating. This formula is also useful to preserve the finish of various surfaces, the sparkle and cleanliness of cut or polished glass, and the finish of natural, painted or varnished woods, plastics and leather. It is especially useful as an anti-tarnish or anti-oxidation coating for copper, silver, brass and aluminum, stainless steel, galvanized sheet metal, pewter and other metals or alloys that form an undesirable oxidized or corroded surface unless otherwise protected.

The same formula can be used to provide a protective and attractive coatings on living plants, fresh fruits and vegetables. In the latter instances, the fruit and vegetable shelf-life is significantly lengthened.

EXAMPLE IV

The polyvinyl phthalate resin of Example I was used to prepare the following composition:

| | Weight percent |
|---|---|
| Isopropanol/methanol 2:1 | 88.5 |
| Methylethyl ketone | 4.0 |
| Polyethylene glycol 400 monolaurate | 0.5 |
| Resin of Example I | 7.0 |

EXAMPLE V

The polyvinyl phthalate resin of Example I was used to prepare the following composition:

| | Weight percent |
|---|---|
| Propylene glycol | 90 |
| Resin of Example I | 10 |

EXAMPLE VI

The polyvinyl phthalate resin of Example I was used to prepare the following composition:

| | Weight percent |
|---|---|
| Ethanol anhydrous | 89 |
| Water | 3 |
| Resin of Example I | 7 |
| Polyethylene glycol 400 monolaurate | 1 |

EXAMPLE VII

The polyvinyl phthalate resin of Example I was used to prepare the following composition:

| | Weight percent |
|---|---|
| Acetone anhydrous | 91 |
| Water | 2 |
| Resin of Example I | 6 |
| Polyethylene glycol 400 monolaurate | 1 |

EXAMPLE VIII

The polyvinyl phthalate resin of Example I was used to prepare the following composition:

| | Weight percent |
|---|---|
| Acetone anhydrous | 73 |
| Resin of Example I | 25 |
| Polyethylene glycol 400 monolaurate | 2 |

EXAMPLE IX

The polyvinyl phthalate resin of Example I was used to prepare the following composition:

| | Weight percent |
|---|---|
| Isopropanol | 86 |
| Water | 3 |
| Resin of Example I | 10 |
| Polyethylene glycol 400 monolaurate | 1 |

EXAMPLE X

The polyvinyl phthalate resin of Example I was made up into an aerosal composition in the following proportions:

| | Weight percent |
|---|---|
| Resin of Example I | 1.0 |
| Acetone | 24.5 |
| Diacetone alcohol | 0.5 |
| Alcohol SDA 40 anhydrous | 34.0 |
| Genetron 12/11 (70:30) | 40.0 |

EXAMPLE XI

The composition of Example III is used to coat galvanized steel to protect it. The coating can be removed by washing at ambient temperatures with a 1% aqueous solution of trisodium phosphate.

EXAMPLE XII

The composition of Example II is made in a concentration of 1% by weight resin and used as a hair spray.

EXAMPLE XIII

The composition of Example VI was employed in the treatment of athlete's foot. The infected area was coated and allowed to dry. Immediate relief was afforded. In a few days the infected area cleared and was free of infection.

Compositions of the type described in the examples have been found to be usable to form films or coatings by ordinary practices of dipping, wiping, pouring, knife coating, offset coating or spray coating. Films in the spray form have been prepared using commercial air spray guns using up to 40 pounds per square inch (p.s.i.g.), as well as packaged in aerosol containers that use fluorinated hydrocarbons, carbon dioxide and nitrogen dioxide as propellants.

In general, it is preferable to prepare solvent compositions containing a minimum of about 1% by weight of the resin. The resin content will vary depending upon the method of application. Thus, compositions intended for spraying will usually contain 1% to 10% by weight resin. Compositions intended for knife or roller type coating will usually contain from 3% to 15% resin. Compositions for dip coating can have higher concentrations of resin. Films made from these compositions are tightly adherent to metals, glass, wood, natural materials, such as leather, fruits, living plant leaves and human and animal tissue. They are flexible and highly resistant to oils, greases, hydrocarbons and humidity. Wetting of some formulations causes blushing that clears later. Wet rub resistance is very good. Mechanical marring will scratch the films but not necessarily fracture them. In all cases, these films can be readily removed from an object with a mild alkaline solvent rinse, e.g., a 1% solution of ammonia sodium bicarbonate or trisodium phosphate in water.

The resins prepared as described in the examples are soluble in anhydrous methanol, except that at a concentration of about 50% by weight the viscosity of the solution becomes too high ordinarily for useful purposes. Up to 6% and 8% solutions are usually water white. As the resin concentration goes up, however, the solution develops a yellow cast which becomes more intense as the resin concentration increases. This color value is a function of the resin as made from different raw material sources, the condition of the plant equipment and the process variations exercised in the manufacture of the resin.

The resins are usually incompletely soluble in anhydrous ethanol in concentrations up to about 20% by weight at room temperature. Higher concentrations, however, are completely soluble at room temperature. The resins are theorized to have a molecular weight range corresponding to the starting polyvinyl alcohol raw material. When 20% or less concentrations are prepared by dissolving in ethanol by heating they will form a completely clear solution at a temperature of 100–120° F. but this reverts to a two-phase system on cooling. The upper phase is a clear solution and the lower layer has a gel nature, thus illustrating a range of resin molecular weight undergoing a solvent fractionation process. These phases can be separated and used as such.

The behavior of the resins in isopropanol is similar to that in ethanol but to a lesser degree. For all practical purposes, the resins disperse but do not dissolve in isopropanol at room temperature (78° F.). Solutions heated to about 140° F. are clear. On cooling, the dissolved resin almost completely precipitates.

At room temperatures low concentrations of the resins are almost completely soluble in acetone. The solutions are slightly cloudy and/or opalescent. Heating the solution contributes a slight improvement in that the cloudiness or opalescence lessens. Filtering produces a clear filtrate. At higher concentrations of resin, around 20–25% by weight acetone, solutions are complete and clear at room temperature. Higher molecular weight alkyl ketones in general behave similarly to acetone but the longer or more branched the alkyl radicals become, the more difficult it becomes to solubilize the resin.

The resins prepared in accordance with the invention will form resin solutions with simple, short chain aliphatic alcohols, ketones, anhydrous esters, anhydrous ethers and with oxygenated aromatic solvents. Lower and higher concentrations of clear resin solutions at room temperature can also be made with anhydrous glycols.

The resins are either completely or partially soluble in mixed solvent systems comprising oxygenated compounds, for example, alcohols, ketones, esters, ethers, glycols and some cyclic oxygenated compounds. In all cases, where the resin is incompletely soluble, the addition of small amounts of water, methanol, acetone, simple esters and ethers, will cause complete solubility of the resin. For example, at room temperature anhydrous ethanol forms a clear, stable resin solution when mixed with 5% to 10% by weight of either methanol or acetone. In general, the higher the molecular weight of the alcohol used in the solvent system, the more methanol or acetone that is needed to produce a clear resin solution. Not only binary but also ternary and higher order cosolvent mixtures between alcohols, ketones, esters and glycols can be used.

The addition of small amounts of water to the solvent systems described above produces striking improvements in the solvent power of the anhydrous solvent. For example, 1% to 3% of water added to acetone, methylethyl ketone or ethanol produces sparkling clear resin solutions. The useful range of the amount of water added to the solvent system is narrow and a function of the total solvent system. This ratio of water to solvent that can be tolerated in the formula can be significantly altered by the use of surfactants. In any event, excess water will cause the resin to precipitate.

Hydrocarbons, chlorinated hydrocarbons and aromatic hydrocarbons will not dissolve the resins. Amines, both aliphatic and cyclic, solubilize the resins by forming the amine salt which in turn imparts water solubility. Alkalies (e.g., sodium hydroxide or potassium hydroxide) solubilize the resins by forming the corresponding salt which is water soluble. Polyvalent alkalies (e.g., calcium hydroxide) and polyfunctional moieties capable of reacting with the carboxylic group in the resin will either precipitate the resin out of solution or will form an insoluble resin film or fiber under suitable drying conditions. Water soluble salts and the resins, such as those formed by the addition of ammonium or volatile amines (e.g., methylamine, morpholine) when dried under appropriate conditions, are converted to the original carboxylic form of the resin and are no longer water soluble, whereas the alkali metal resin salts, although they form good clear films, are permanently water soluble until converted to the acid form by an acid rinse, e.g., dilute hydrochloric or acetic acid. In preparing the foregoing resins, it should be understood that the polyvinyl alcohol is made by hydrolyzing a polyvinyl acylate (e.g., polyvinyl acetate) and the resultant polyvinyl alcohol can be a mixture which will vary depending upon the degree of hydrolysis. These mixtures are made by hydrolyzing either with an alkali or an acid and are usually identified by resin types according to viscosity, percent residual polyvinyl acetate and percent hydrolysis. Typical resin types are described as 1–90, 3–90, 20–90, 1–60, 3–60, 20–60, 1–30, 20–30, 40–20, 40–10, 2/75 and 2/55. A number of polyvinyl alcohols of this type are sold under the name Gelvatol. Any of these can be used in the present process but especially good results have been obtained with the 40–10 polyvinyl alcohol which is alkali hydrolyzed and contains 37–42% residual polyvinyl acetate.

The following table gives the characteristics of various polyvinyl alcohol starting materials.

TABLE

| Resin type | Viscosity | Percent Residual polyvinyl-acetate | Hydrolysis |
|---|---|---|---|
| 1–90 | 55–65 | 0–2 | 100–99 |
| 3–90 | 45–55 | 2–4 | 99–97.9 |
| 20–90 | 35–45 | 19.5–24 | 89–86 |
| 1–60 | 28–32 | 0–2 | 100–99 |
| 3–60 | 23–28 | 2–4 | 99–97.9 |
| 20–60 | 21–25 | 19.5–24 | 89–86 |
| 1–30 | 4–6 | 0–3 | 100–98.5 |
| 20–30 | 4–6 | 19.5–21.5 | 89–87.7 |
| 40–20 | 2–3 | 37–42 | 77.0–72.9 |
| 40–10 | 1.3–2 | 37–42 | 77.0–72.9 |
| 2/75 | ¹35 | 0–2 | 99 |
| 2/55 | 23–39 | 0–3 | 98.5 |

¹ Minimum.

From the foregoing description, it will be apparent that the invention is especially useful for many purposes. Special mention may be made of the use of the invention in the coating of metal surfaces in the virgin or freshly prepared state to preserve that state, for example, in manufacturing operations where the metal surfaces are likely to become corroded between several stages of the operation. Thus, the coating compositions of the invention can be applied to galvanized iron or steel to protect the finish and preserve the fresh chemical surface prior to subsequent coating. It can also be applied to stainless steel to preserve a brush finish. It can be applied to pewter surfaces. In addition, they can be applied to bright ware made of copper, silver, brass or aluminum in order to prevent tarnish. They can be applied to leather as preservative and decorative coatings. They can be used on textile materials. They are essentially non-toxic in the small amounts required to produce a surface coating and in fact have the ability to inhibit the growth of microorganisms, such as fungi. Hence, they can be used on the skin and are effective in the treatment and localizing of such skin diseases as athlete's foot. In addition, they can be employed as hair sprays.

Another important use of the compositions of the invention is in the coating of fruits, vegetables, and nuts, including, for example, oranges and grapefruit, in order to prolong their shelf-life and enhance their appearance. Likewise they can be employed for forming coatings on living plants to reduce their sensitivity or need for moisture, to enhance their appearance, and for other systemic effects. They are especially useful for the protection of finished metal assemblies, for example, automobiles prior to painting, for the protection of electrical systems, including electrical circuit boards and semiconductors, and for the protection of optical equipment. They can also be used in coating photographic film and prints.

I claim:

1. A process for preparing polyvinyl dicarboxylic acid resin products which consists essentially of reacting without a catalyst a dicarboxylic acid anhydride with a polyvinyl alcohol in an anhydrous solvent from the group consisting of dioxane and cyclohexanone, and recovering a resin product which is insoluble in water, soluble in methanol, acetone, mixtures of acetone and methanol, propylene glycol, mixtures of isopropanol and methanol, incompletely soluble in anhydrous ethanol in concentrations up to 20% at 78° F. but soluble when heated to 100–120° F., incompletely soluble in isopropanol at 78° F. but soluble when heated to 140° F., and soluble in solutions of acetone, methylethyl ketone or ethanol containing 1% to 3% water.

2. A process as claimed in claim 1 in which said anhydride is phthalic anhydride.

3. A process as claimed in claim 1 in which said polyvinylalcohol is an alkali hydrolyzed polyvinyl acetate.

4. A process as claimed in claim 3 in which said hydrolyzed polyvinyl acetate contains 37–42% acetate.

5. A process for preparing polyvinyl phthalates which consists essentially of reacting without a catalyst phthalic anhydride and a polyvinyl alcohol in anhydrous dioxane at a temperature within the range of 90° C. to 100° C., adding an aqueous solution of ammonium hydroxide to the resultant solvent solution of the product, thereafter adding an aqueous solution of hydrochloric acid to regenerate the acid form of the product, and separating the precipitated mass.

6. A process as claimed in claim 1 in which the reaction is carried out by heating to a temperature of at least 90° C.

7. A process as claimed in claim 6 in which the temperature of reaction is 95°–100° C.

8. A process of inhibiting the growth of microorganisms which comprises contacting said microorganisms with a growth inhibiting amount of a resin resulting from the process of claim 1.

9. A process as claimed in claim 8 in which said microorganisms are fungal microorganisms.

References Cited
UNITED STATES PATENTS

| | | | |
|---|---|---|---|
| 2,275,685 | 3/1942 | Salo | 260—78.5 U |
| 2,759,909 | 8/1956 | Hiatt et al. | 260—78.5 U |
| 2,484,415 | 10/1949 | Malm et al. | 260—78.4 |
| 2,796,413 | 6/1957 | Baer | 260—78.4 |

WILBERT J. BRIGGS, Sr., Primary Examiner

U.S. Cl. X.R.

117—132 R, 139.5 A, 142, 161 R; 29.6 B, 29.6 E 30.4 R, 32.8 R, 33.4 R, 78.5 R; 424—47, 70, 313, DIG 1